March 16, 1926.
G. ROESSNER
IRRIGATION SYSTEM
Filed Jan. 21, 1925
1,576,790
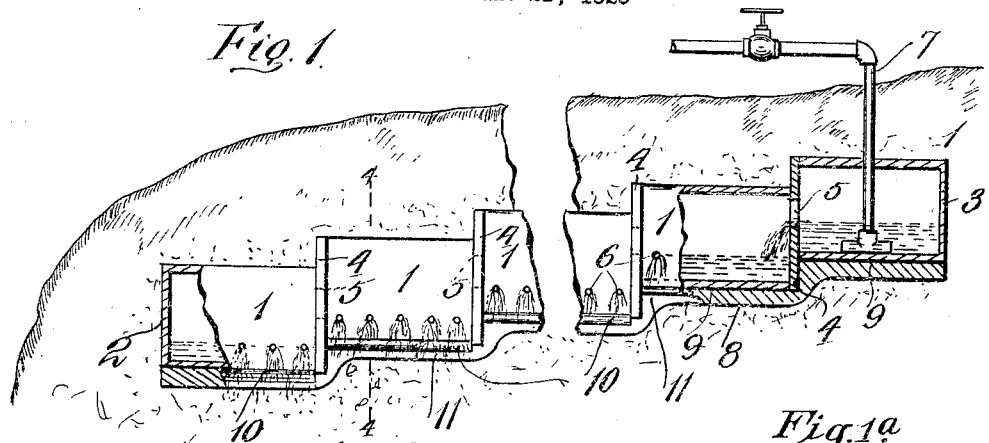
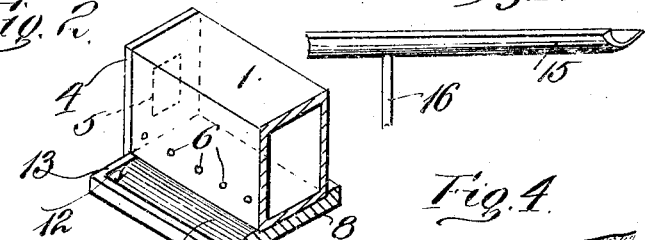
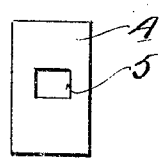
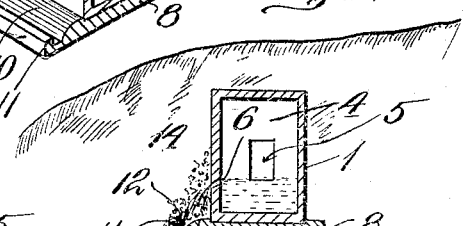
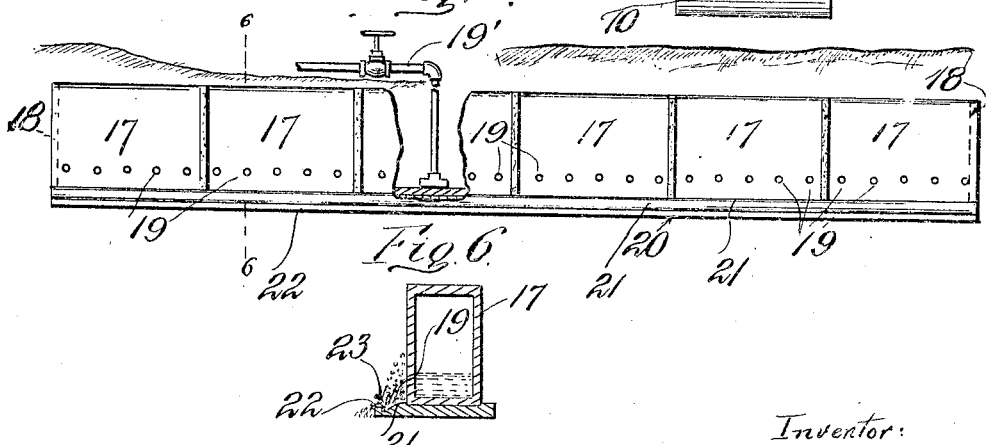
Inventor:
George Roessner,
by Anton Glautzner Jr.
Atty.

Patented Mar. 16, 1926.

1,576,790

UNITED STATES PATENT OFFICE.

GEORGE ROESSNER, OF LOS ANGELES, CALIFORNIA.

IRRIGATION SYSTEM.

Application filed January 21, 1925. Serial No. 3,781.

*To all whom it may concern:*

Be it known that I, GEORGE ROESSNER, a citizen of Germany, residing at Los Angeles, county of Los Angeles and State of California, have invented a certain new and useful Improvement in Irrigation Systems, of which the following is a specification.

My invention relates to a means for irrigating lands, particularly in such countries where surface watering is unsatisfactory, useless and wasteful on account of the peculiar condition of the soil which prevents ready percolation through it and holds the water upon the ground surface, from which it either evaporates or gravitates to lower levels without penetrating it in any appreciable quantity.

The invention is designed chiefly to supply water in measured quantities to rolling lands, hillsides, and generally to undulating territory, and in such manner that it is protected from the evaporative effects of atmospheric conditions and confined to certain and definite areas and localities from which a general irrigation of the sub-soil may be effected gradually and thoroughly by the natural process of gravitation and dispersion.

The objects of the invention are to provide a simple arrangement by which water in any quantity may be furnished to the ground below the surface thereof and regardless of the ground slope; and to provide a system of subterranean irrigation which may be readily installed and by which selected areas may be irrigated as required.

Other objects of the invention will appear from the subjoined specification, in connection with the accompanying drawing, which represents generally the form of embodiment of the invention and in which—

Fig. 1 is a front view, partly in section, showing my invention as applied to a sloping ridge.

Fig. 1ª is a perspective view showing a water receiving trough arranged for placement in the ground.

Fig. 2 is a perspective view of one of the distributing heads, showing the disposition thereof upon the base provided for it.

Fig. 3 is a front view on one of the gates or partitions for maintaining a definite quantity of water in each distributing head.

Fig. 4 is a section on line 4—4, Fig. 1, showing a distributing head and the base upon which it is mounted, also means for facilitating percolation of water.

Fig. 5 is a front view of a form of the invention used for irrigating rolling lands and hillsides of substantially regular contour, and Fig. 6 is a section on line 6—6, Fig. 5.

In Fig. 1 of the drawing, I have illustrated a form of the invention designed for subsurface irrigation of territory which terminates in ridges and slopes away from a substantially horizontal portion of the hillside with which such sloping territory or ridge is contiguous.

In Fig. 5 I have illustrated a form of irrigation system for rolling lands generally, unbroken by sharp and defined contours. In cases where a rolling hillside terminates in a ridge, both forms co-operate to provide the necessary irrigation, as will appear more clearly hereafter.

Referring in detail to Fig. 1, the invention is shown as comprising a plurality of hollow boxes or receptacles 1, of any suitable shape and of any desirable material, as concrete, clay, iron, and the like, forming when conjoined, as pointed out presently, a unit or composite section in which all the hollow boxes or receptacles are in communication. These receptacles 1, which are substantially distributing heads, are open at their respective ends, as seen, but the end receptacle of each unit are provided with walls 2 and 3, which completely close the entire unit.

The distributing heads 1 are, as shown, arranged in stepped relation and the extent of such stepping of the heads is governed by the degree of the slope or inclination of the ridge in which the system of conjoined units is to be embedded. The conjoining of the individual distributing heads may be effected in any desirable manner, but I prefer to employ the means shown in Fig. 3, and comprising a gate or partition 4, which is arranged to be cemented or otherwise fastened to the ends of the distributing heads 1. These gates 4 are each provided with an opening 5, by which the level of the water in each distributing head is regulated and through which the water may flow from one compartment to another. They are of sufficient length, as shown, to form a closure for abutting receptacles or heads disposed progressively in different lower planes.

Each distributing head is provided with a row of holes or water outlets 6, which are approximately on a level or in line with or slightly higher than the openings 5 in the gates or partitions 4, whereby the water, supplied from a suitable source 7, disposed in the upper distributor head, flows freely through the holes or outlets 6, and the surplus quantity or overflow passes through the openings 5 into the next distributor head. These holes or outlets are preferably provided on that side only of the distributor heads which faces the slope of the ground, and are disposed at an angle to the vertical, as shown, Figs. 4 and 6, in order to prevent ingress of dirt or other obstructions and consequent impedance of the flow of water.

In the disposition of the distributing heads in progressively stepped relation, as shown in Fig. 1, and explained, it is necessary that the conjoined units be maintained in a horizontal plane, and to effect this and also to form a solid and substantial foundation for the units, I have provided the arrangement shown in Figs. 1, 2, 4, 5 and 6, and co-operating with the distributing heads 1, to cause the water to be evenly distributed and without any disintegrating effects or erosive force, for the important purpose of making possible an easy, regular and effective percolation and dissemination of the water below the ground surface. This arrangement consists of a base 8 of concrete or other substantial composition, formed with a series of steps 9, each of which is indented to receive the distributing heads 1 and prevent their dislocation upon said base 8 when covered by the earth. The distance of the plane of one step 9 from another is sufficient to accommodate the extended part of the gate or partition 4. The base is provided, immediately in front of each distributor head 1, with means to prevent splashing of the water, as a curving portion 10, and with a ledge or lip 11, which, with said curving portion 10, forms a trough 12, which is closed at the ends by a wall 13. These troughs 12 are provided to receive and support a mass of loose fragments 14, such as cinders, loose gravel and the like, which is deposited upon said trough to a height sufficient to reach above the holes or outlets 6, and which, while excluding clogging accumulations, provide voids through which the water may find easy passage and escape into the troughs 12 and over the ledges or lips 11 of the base 8 into the soil. In this wise the individual streams issuing from the distributing heads are diverted from passage directly into the ground, which otherwise would be eroded by them with detrimental results.

As stated, a plurality of the distributor heads 1, conjoined as described, and mounted upon a base, as set out, constitutes a unit and in irrigating a slope or ridge of considerable area, obviously a number of these units are employed. In such instances, I have found it desirable, in order to prevent waste, to provide a basin or drain 15, at points between the various units or at such places where most needed, and by these basins to transfer the water to units lying in lower levels. These basins for this purpose are provided with a downwardly extended pipe 16, through which the water is carried to another unit, if desired.

In Fig. 5, I have shown an arrangement for irrigating hillsides, and in general, undulating territory, where practically a horizontal line may be followed regardless of surface delineations.

This arrangement consists of a plurality of individual distributor heads which are in the form of open-ended sections 17, and which are arranged to be conjoined by any cementitious material to form a composite, hollow water-receiving unit, as shown. The ends of the end sections of the unit are closed by walls 18, and each section of the unit is provided with a row of outlets 19, which, as seen in Fig. 6, are at an angle to the vertical and through which water, delivered to the unit from a suitable supply 19', escapes. The unit which comprises a plurality of conjoined sections 17, is supported and maintained in horizontal position by a suitable base 20, grooved, as shown at 20', Fig. 6. This base 20 is formed with a curving portion 21, and a lip or ledge 22, providing a trough 23, which receives and from which the water escapes in a quiet, thin film into the ground, thereby preventing uneven sub-surface distribution. The ends of this trough 23 are closed to cause the water to flow over the top of the trough, and the trough also serves to support a mass of loose material through which the water may percolate freely.

What I claim, is:

1. A subterranean irrigation system comprising a base formed with recesses and having a curving portion terminating in a ledge and providing between such curving portion and ledge a trough for cinders and the like, a plurality of conjoined, intercommunicating hollow receptacles seated in the recesses of said base, said receptacles provided with a row of openings inclined to the horizontal, and above said trough, whereby to collect and cause the water to overflow said trough.

2. A subterranean irrigation system comprising a base formed with a series of indented steps, each formed with a rounding portion and an upright ledge, the rounding portion and ledge providing a trough for water and a mass of loose fragments, a plurality of hollow receptacles seated in the indentations in said base, partitions between each said receptacle forming closures therefor, said partitions having openings therein above the bottom of the receptacles for determining the level of liquid in each compartment, and the compartment having openings which incline to the horizontal and are disposed above the trough in said base.

In witness whereof I have set my hand.

GEORGE ROESSNER.